Patented Feb. 23, 1943

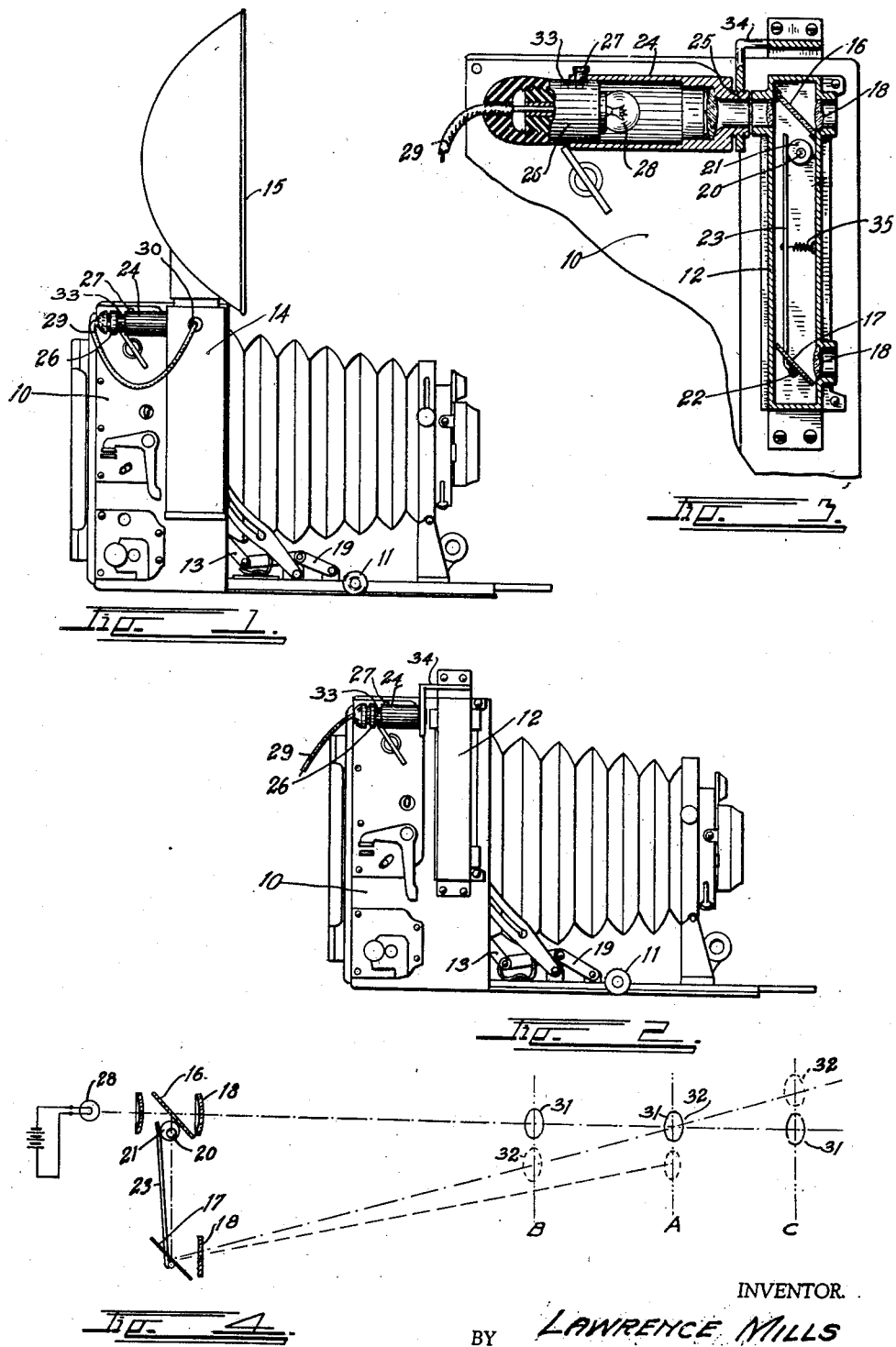

2,312,261

UNITED STATES PATENT OFFICE 2,312,261

FOCUS FINDER FOR CAMERAS

Lawrence Mills, Dallas, Tex.

Application March 28, 1941, Serial No. 385,613

4 Claims. (Cl. 95—44)

This invention relates to a focusing attachment for cameras and has for its principal object the provision of a range finder or focusing attachment for cameras which will enable the operator to quickly and easily bring his camera to a perfect focus on any desired subject at night without the assistance of external illumination.

A further object is to so construct the device so that it may be furnished as a complete unit or as an attachment for range finders of the split image type such as a "Ralert" or the like to enable the latter to be used in darkness.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side view of a typical camera of the "press graphic" type provided with a typical battery case and flash bulb attachment, showing the invention in place;

Fig. 2 is a similar view with the battery case and bulb reflector removed to disclose the range finder with the invention in place thereon;

Fig. 3 is an enlarged vertical section through the improved focusing attachment and range finder; and Fig. 4 is a diagrammatic view illustrating the operation of the invention.

In the drawing typical photographic equipment is illustrated and designated by numeral as follows, camera 10, focusing knob 11, split image range finder 12, range finder operating lever 13, battery case 14, and flash bulb reflector 15.

Range finders of the type illustrated employ a fixed, upper, semi-transparent mirror 16 and a rotatable lower mirror 17. Each mirror is placed behind an objective lens 18 and an eyepiece is provided having suitable lenses in alignment with the upper mirror 16.

The photographer looks into the eyepiece and sees two images of the subject—one reflected from the lower mirror 17 and from the rear face of the upper mirror 16 and one visible directly through the upper mirror 16. The camera is in focus when these two images have been brought into register with each other in the eyepiece.

The registering of the two images is accomplished by tilting the lower mirror 17. The latter is tilted through the medium of the lever 13 which is connected to the traveling bed of the camera by means of suitable links 19 so that as the lens board is racked out and in by means of the focusing knob 11 the lever will be swung to rotate a cam shaft 20 carrying a cam 21. The lower lever is mounted on a pivot shaft 22 and is provided with a cam follower arm 23 which is held against the cam 21 by means of a suitable spring 35. Thus, the lower mirror moves in synchronism with the focusing movements of the camera lens board to register the two images of the subject in the eyepiece when the camera has been brought into perfect focus on that subject. The usual eyepiece is threaded into a bracket plate 34 which aligns it with the upper mirror of the range finder.

As thus far described, the mechanism is a typical split image range finder. In some types different means are used for rotating the movable mirror, in others a split mirror is used at the top to allow the operator's line of vision to pass. In any event, however, two mirrors or reflecting prisms are employed, one of which moves with the movements of the camera lens focusing mount.

This invention makes use of the range finders, above described, as a part thereof and while more particularly designed simply as an attachment to the above range finder it could be built therein as a complete unit if desired.

The invention comprises a tubular lamp housing 24 carrying a suitable projection lens 36 at its forward extremity. This latter extremity of the lamp housing is reduced and threaded to provide a nipple 25 which is threaded directly into the eyepiece opening of the bracket plate 34 after the eyepiece has been removed therefrom, as shown in Fig. 3.

A lamp receptacle 26 slidably enters the rear extremity of the lamp housing and is clamped in any desired position therein by means of a suitable set screw 27. The receptacle carries a small electric lamp 28. A flexible conductor 29 leads from the receptacle 26 to a removable plug 30 which can be plugged into a receiving jack in the battery case 14. The other side of the circuit to illuminate the lamp is grounded and carries through the lamp housing to the shell of the receptacle 26. The lamp can be illuminated whenever desired by simply inserting the plug 30 or a suitable switch may be provided if desired.

The current is derived from the battery ordinarily employed for igniting the flash bulb and operating the shutter release so that additional batteries are not required.

When the lamp is illuminated, two images of the lamp filament are projected forward upon the object being photographed, one from the lower mirror 17 and one through (or past) the upper mirror 16, as indicated at 31 and 32, Fig. 4. The adjustments are such that when the camera is in perfect focus on the subject upon which the filament images are being projected, these two images will overlie each other in perfect register as indicated at the position A Fig. 4. If the camera is then moved toward or away from the subject, the two images 31 and 32 will separate vertically as indicated at the positions B and C, Fig. 4. Of course, the two images 31 and 32 can be brought into register with each other at positions B or C by rotating the focusing knob 11, should it be desired to focus on either of these positions.

The slidable lamp receptacle 26 allows the lamp image to be brought to a sharp focus for any encountered lenses. A scale 33 is marked on the receptacle to enable the operator to place the receptacle at a known focus point without trial when necessary or desired.

No change is necessary in the range finder itself or its adjustments. The invention is only used indoors or at night or in exceedingly dim light. It is unscrewed from the range finder and replaced with the usual eyepiece for outdoor daylight purposes.

Throughout the application and claims, the word split image has been used. It is desired to be understood that this includes both the type of range finder which splits an image in two parts and brings these parts into register as well as the type which by means of semi-transparent mirrors super-imposes two images one over the other.

It is desired to call attention to the fact that the lens 36 is important in condensing and aligning the light rays before they strike the mirrors in order to produce a clear cut image of the light source upon the object being photographed.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. In combination with a camera and a range finder at one side of the camera including a casing having upper and lower openings in its front wall and upper and lower reflectors in the casing in cooperating relation to the said openings and each other, the rear wall of the casing having a sighting opening back of the upper reflector; a lamp housing removably mounted back of the range finder and provided with an opening at its front aligned with the sight opening, and a lamp mounted in the lamp housing for projecting light rays into the range finder through the sight opening thereof, rays from the lamp being split by the upper reflector and portions of the rays passing through the upper opening while other portions are projected through the lower opening by the lower reflector to converge with and intersect the upper rays when the camera is in proper focus with an object at a predetermined distance therefrom.

2. In combination with a camera and a range finder at one side of the camera including a casing having upper and lower openings in its front wall and upper and lower reflectors in the casing in cooperating relation to the openings and each other, the rear wall of the casing having a sighting opening back of the upper reflector; a bracket carried by the camera with a portion disposed back of the range finder and formed with an opening aligned with the sight opening thereof, a lamp housing back of said bracket having a nipple at its front end mounted through the opening of the bracket and removably supporting the housing back of the bracket, and a lamp in said housing for projecting light rays into the range finder where the reflectors split the rays and project them forwardly through the upper and lower front openings of the casing at angles to converge and intersect upon a subject to be photographed when the camera is in proper focus a predetermined distance from the said subject.

3. In combination with a camera and a range finder at one side of the camera including a casing having upper and lower openings in its front wall and upper and lower reflectors in the casing in cooperating relation to the openings and each other, the rear wall of the casing having a sighting opening back of the upper reflector; a bracket carried by the camera with a portion disposed back of the range finder and formed with an opening aligned with the sight opening, a lamp housing back of said bracket having a nipple at its front end mounted through the opening of the bracket and removably supporting the housing back of the bracket, a socket shiftable longitudinally in said housing to adjusted positions, and a lamp carried by said socket within the housing for projecting light rays into the range finder through the sighting opening thereof where the reflectors split the rays and project them forwardly through the upper and lower openings in the front of the casing at angles to converge and intersect upon a subject to be photographed when the camera is in proper focus a predetermined distance from the subject.

4. In combination with a camera and a range finder at one side of the camera including a casing having upper and lower openings in its front wall and upper and lower reflectors in the casing in cooperating relation to the openings, the rear wall of the casing having a sighting opening back of the upper reflector; a bracket carried by the camera with a portion disposed back of the range finder and formed with an opening aligned with the sighting opening, a cylindrical lamp housing back of said bracket open at its rear end and having a nipple projecting forwardly from its front end and engaged through the opening of the bracket to mount the housing horizontally in alignment with the sighting opening, a socket mounted in the housing through the rear end thereof and shiftable longitudinally of the housing to adjusted positions, and a lamp carried by said socket within the housing for projecting light rays into the range finder through the sighting opening thereof where the reflectors split the rays and project them forwardly through the upper and lower openings in the front of the casing at angles causing them to converge and intersect upon a subject to be photographed when the camera is in proper focus a predetermined distance from the subject.

LAWRENCE MILLS.